United States Patent [19]

Kitagawa et al.

[11] Patent Number: 4,747,456
[45] Date of Patent: May 31, 1988

[54] LOAD CELL AND TEMPERATURE CORRECTION OF THE SAME

[75] Inventors: Tohru Kitagawa; Takaharu Yamashita, both of Shizuoka, Japan

[73] Assignee: Tokyo Electric Co., Ltd., Tokyo, Japan

[21] Appl. No.: 31,670

[22] Filed: Mar. 30, 1987

[30] Foreign Application Priority Data

Mar. 28, 1986 [JP] Japan ................................. 61-70196

[51] Int. Cl.⁴ .......................... G01G 3/14; G01B 7/16; G01L 1/22
[52] U.S. Cl. ...................................... 177/211; 73/766; 338/3
[58] Field of Search ........................ 177/211; 338/2, 3; 73/862.65, 766

[56] References Cited

U.S. PATENT DOCUMENTS 4,158,396 6/1979 Suzuki et al. .
4,299,130 11/1981 Koneval ................. 338/2 X
4,332,174 6/1982 Suzuki et al. .
4,343,197 8/1982 Suzuki et al. .
4,432,247 2/1984 Takeno et al. ..................... 73/766 X
4,630,491 12/1986 Kitagawa et al. .................. 338/2 X Primary Examiner—George H. Miller, Jr.
Attorney, Agent, or Firm—Oblon, Fisher, Spivak, McClelland & Maier

[57] ABSTRACT

A load cell and a method of correcting the same are provided wherein a beam member on which an insulator film is formed is prevented from being trimmed by a laser beam upon laser trimming thereof. The load cell comprises a span resistor member and a zero point resistor member both formed separately of the beam member and including a span temperature correcting thin film resistor and a zero point balance temperature correcting thin film resistor, respectively, each of which has a temperature coefficient and is formed on a substrate. The resistor members are applied to the insulator film on the beam member and the thin film resistors are connected to a bridge circuit. The thin film resistors are trimmed with a laser beam to correct the span temperature correcting thin film resistor and the zero point balance temperature correcting thin film resistor for temperature. The substrates intercept a laser beam upon laser trimming of the thin film resistors.

8 Claims, 3 Drawing Sheets

LOAD CELL AND TEMPERATURE CORRECTION OF THE SAME

FIELD OF THE INVENTION AND RELATED ART STATEMENT

This invention relates to a load cell for use with an electronic weighing instrument or the like, and more particularly to a load cell having a fixed characteristic which is not influenced by a temperature change and also to a method of correcting such a load cell for temperature.

Generally in load cells, an insulator film is first formed on a surface of a beam member, and then a resistor film and a conductor film are formed in layers on the insulator film by evaporation, sputtering or a like process and are then selectively etched to form strain gauges at locations of the insulator film adjacent thin film deformable portions of the beam member whereafter leads for electric connection are formed on the insulator film to complete a bridge circuit of the thin film strain gauges. Some of such conventional load cells include a zero point balance correcting resistor connected to such a bridge circuit of strain gauges.

Meanwhile, load cells require correction for temperature with respect to a zero point balance and a span thereof. This is because resistances of such strain gauges vary as the temperature changes. As a typical one of conventional methods of such temperature correction, temperature correction for the zero point balance is attained by adjusting a length of a thin copper wire while temperature correction for the span is attained by trimming, using a cutter or the like, a Ni film resistor which is formed by rolling a Ni wire or Ni and applying the rolled Ni wire or Ni to an insulator film on a beam member.

Problems of the prior art described above will now be described. In case a copper wire and a Ni wire are used to attain temperature correction for a zero point balance and a span, respectively, the copper and Ni wires are cut into strands of lengths of corrected values and are then soldered to a bridge circuit. Accordingly, such operation is troublesome and hence the operability is low. On the other hand, in case a Ni film is used to attain intended temperature correction described above, the Ni film resistor must be trimmed manually using a cutter or the like, and such operation is similarly troublesome.

It is to be added that such means for correcting the temperature of a load cell using a film as shown in FIG. 8 wherein a ladder-shaped resistor pattern 3 is formed on an insulator film 2 on a beam member 1 and is trimmed by a laser beam for temperature correction is also known. However, in the case of the means just described, it is difficult to achieve laser trimming in such a manner that a trimmed portion (cut portion) 4 may not reach the beam member 1 upon trimming for such correction, and actually there is a defect that such a trimmed portion 4 may reach the beam member 1 and damage the insulation of the latter.

OBJECTS AND SUMMARY OF THE INVENTION

It is a first object of the present invention to provide a load cell and a method of correcting the load cell for temperature wherein a trimmed portion upon laser trimming of the load cell will not reach a beam member.

It is a second object of the invention to provide a temperature corrected load cell which can be produced in a high operability.

It is a third object of the invention to provide a load cell and a method of correcting the load cell for temperature wherein the temperature of the load cell can be corrected with accuracy.

In order to attain the objects, according to the present invention, a load cell comprises a span resistor member and a zero point resistor member both formed separately of the beam member and including a span temperature correcting thin film resistor and a zero point balance temperature correcting thin film resistor, respectively, each of which has a temperature coefficient and is formed on a substrate. The resistor members are applied to the insulator film on the beam member and the thin film resistors are connected to a bridge circuit. The thin film resistors are trimmed with a laser beam to correct the span temperature correcting thin film resistor and the zero point balance temperature correcting thin film resistor for temperature.

Thus, upon laser trimming of the load cell for temperature correction for a span and a zero point balance, the beam member under the insulator film will not be trimmed due to the presence of the substrates of the resistor members on the insulator film. Accordingly, trimming can be achieved readily without damaging the insulation of the load cell.

DESCRIPTION OF THE PREFERRED EMBODIMENT

Figure 1:
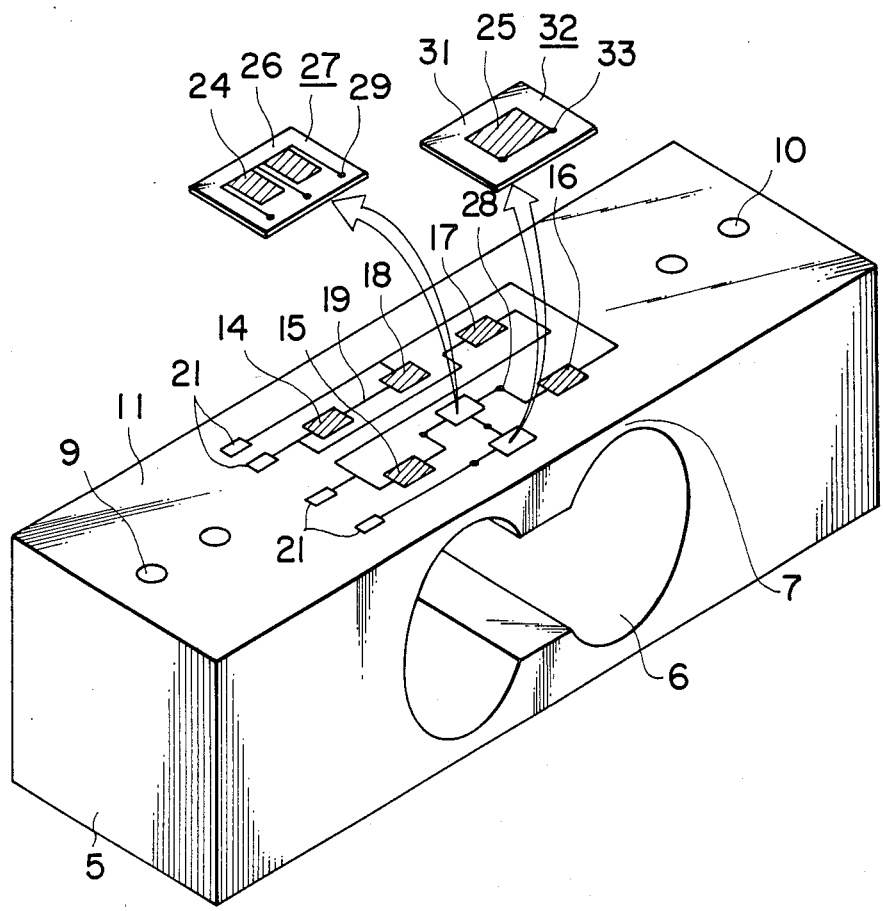
FIG. 1 is a perspective view of an entire load cell according to the present invention with resistor members shown partly in an enlarged scale.
Figure 2:
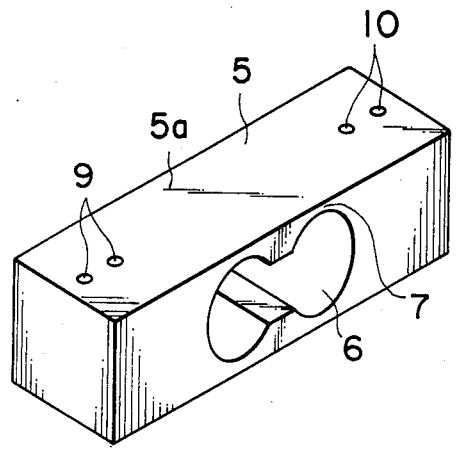
FIG. 2 is a perspective view of a beam member of the load cell of FIG. 1.

An embodiment of the present invention will now be described with reference to FIGS. 1 to 7. A load cell according to the invention includes a beam member 5 as generally shown in FIG. 2. The beam member 5 is in the form of an elastic rectangular parallelepiped made of a metal material such as duralumin and having a substantially 8-shaped transverse hole 6 formed in a vertical wall thereof by machining thereby to define four upper and lower thin material deformable portions 7. An upper face of the beam member 5 is constituted as a bridge circuit forming face 5a which will be hereinafter described and is hence polished into a flat face. The beam member 5 has a pair of mounting holes 9 formed at an end portion thereof for mounting the entire load cell to a support while another pair of mounting holes 10 are formed at the other end portion of the beam member 5 for mounting a load receiving plate.

Figure 3:
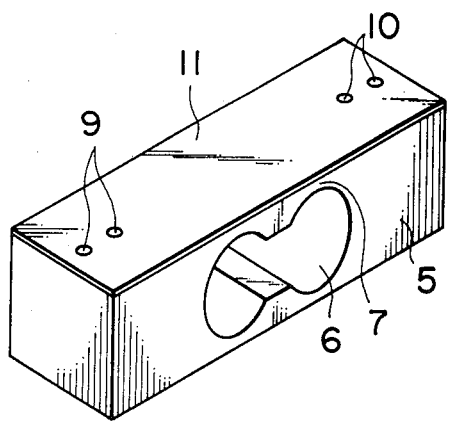
FIG. 3 is a perspective view of the beam member of FIG. 2 on which an insulator film is formed.

An insulator film 11 is formed directly on the circuit forming face 5a of the beam member 5 as shown in FIG. 3. The insulator film 11 may be formed from an inorganic insulating material such as, for example, SiO$_2$ or else from an organic insulating material such as, for example, a polyimide resin. The insulator film 11 has a sufficiently small thickness of, for example, several to several tens microns so that it may not have an influence on the sensitivity of the thin material deformable portions 7 of the beam member 5.

Figure 4:
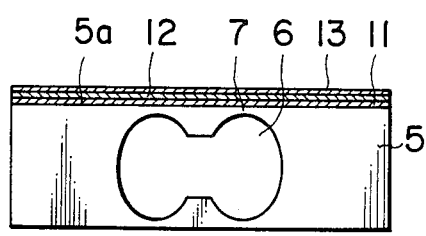
FIG. 4 is a front elevational view of the beam member of FIG. 2 on which films including the insulator film are formed.
Figure 5:
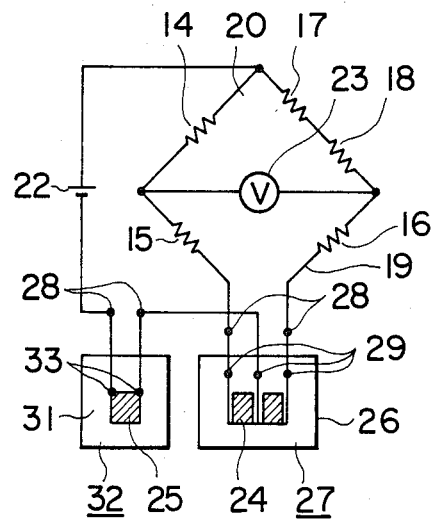
FIG. 5 is a circuit diagram of a bridge circuit of the load cell of FIG. 1.

An electric circuit is formed from strain gauges and so on on the insulator film 11. At first, a first layer 12 and a second layer 13 are formed in layers on the insulator film 11 as shown in FIG. 4. The first layer 12 may be formed from a thin resistor film of NiCr or the like to be used for a strain gauge resistor thin film and also for a zero point balance correcting resistor thin film and may be produced by a thin film forming technique such as evaporation, sputtering or plating. Meanwhile, the second layer 13 may be formed from a thin conductor film of Cu or the like to be used for leads for electric connection and may similarly be produced by a thin film forming technique such as evaporation or the like. The first and second layers 12, 13 are selectively etched into predetermined patterns by photoetching or the like. Consequently, as illustratively shown in FIG. 1, four thin material strain gauges 14 to 17 and a zero point balance correcting resistor 18 are formed from the first layer 12 such that the four thin material strain gauges 14 to 17 are located on upper ones of the four thin material deformable portions 7 of the beam member 5 and the zero point balance correcting resistor 18 is located near the thin film strain gauge 14 while leads 19 for electrically connecting the thin material strain guages 14 to 17 and the zero point balance correcting resistor 18 into a bridge are formed from the second layer. A bridge circuit 20 (refer to FIG. 5) is formed in this manner. Leads 19 are also formed for input/output terminals 21. The input/output terminals 21 are connected to an input power source 22 and an output device 23 such as an amplifier of the circuit shown in FIG. 5.

Figure 6A:
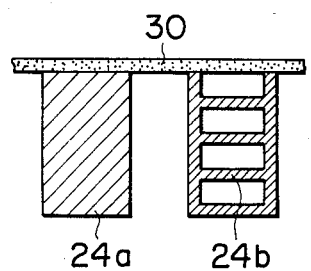
FIGS. 6(a) and 6(b) are plan views of a thin film resistor for temperature correction for a zero point balance before and after trimming.

In the present embodiment, however, the two adjacent thin material strain gauges 15, 16 in the bridge circuit 20 are not directly connected to each other but a zero point balance temperature correcting thin film resistor 24 is interposed therebetween. A span temperature correcting thin film resistor 25 is also interposed between the zero point balance temperature correcting thin film resistor 24 and the input power source 22. As particularly seen from a partially enlarged view in FIG. 1, the zero point balance temperature correcting thin film resistor 24 is formed on a substrate 26 as a zero point balance resistor member 27. The substrate 26 of the zero point balance resistor member 27 is applied to the insulator film 11 on the beam member 5, and the zero point balance temperature correcting thin film resistor 24 is connected to the thin material strain gauges 15, 16 by connecting terminals 28 formed on the leads 19 from the thin material strain gauges 15, 16 to terminals 29 formed on the zero point balance temperature correcting thin film resistor 24 side. More particularly, the zero point balance temperature correcting thin film resistor 24 is formed by forming a resistor thin film of a metal having a temperature coefficient such as Ni or Ti on the substrate 26 formed from a thin film substrate of a ceramics material or the like by evaporation, sputtering or the like and by etching the metal resistor thin film into a predetermined pattern. In the pattern of the zero point balance temperature correcting thin film resistor 24 in the present embodiment, it is divided into two thin film resistors including a thin film resistor 24a of a filled up rectangular pattern and the other thin film resistor 24b of a ladder-shaped pattern as shown in FIGS. 1 and 6(a). The thin film resistors 24a, 24b are connected in series by a lead 30, and three terminals 29 extend from an intermediate point and opposite ends of the lead 30.

On the other hand, the span temperature correcting thin film resistor 25 is similar to the zero point balance temperature correcting thin film resistor 24 and is formed on a substrate 31 and thus formed as a span resistor member 32 as particularly shown in a partially enlarged view in FIG. 1. The substrate 31 is applied to the insulator film 11, and the span temperature correcting thin film resistor 25 is connected to the bridge circuit by connecting terminals 33 formed on the span temperature correcting thin film resistor 25 side to the central one of the terminals 29 of the zero point balance temperature correcting thin film resistor 24 and to that one of the terminals 28 which extends from the input power source 22. Here, the span temperature correcting thin film resistor 25 is also produced by forming a resistor thin film of a metal having a temperature coefficient such as Ni or Ti on the substrate 31 formed from a thin film substrate such as a ceramics material or the like by evaporation, sputtering or the like and by etching the metal resistor thin film into a predetermined pattern such as, for example, a filled up rectangular pattern.

It is to be noted that the substrates 26, 31 may be applied to the insulator film 11 using a bonding agent or the like and are located at such positions at which they may not have a bad influence on deformation of the beam member 5 and particularly at positions other than the thin material deformable portions 7 of the beam member 5.

Figure 6B:
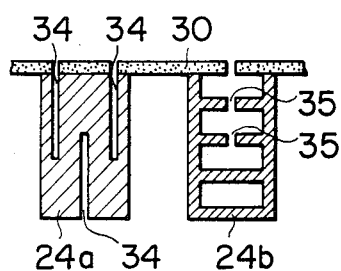

After the span resistor member 32 and the zero point balance resistor member 27 are applied to the insulator film 11 and connected to the bridge circuit 20 in this manner, temperature correction of the load cell is achieved. In particular, a temperature of the beam member 5 is detected to measure a temperature characteristic of the zero point balance and a temperature characteristic of the span, and then correction values are calculated from results of such measurements whereafter the zero point balance temperature correcting thin film resistor 24 and the span temperature correcting thin film resistor 25 are trimmed by a laser beam so that they may have individual predetermined resistances. For example, in the case of the zero point balance temperature correcting thin film resistor 24, it is trimmed to change the initial pattern thereof as shown in FIG. 6(a) to another pattern as shown in FIG. 6(b) in order that it may have a predetermined resistance. As the zero point balance temperature correcting thin film resistor 24 is divided into the two thin film resistor portions 24a, 24b in the present embodiment, a serial resistance can be changed by changing trimmed portions 34 at the thin film resistor 24a while a parallel resistance can be changed by changing trimmed portions 35 at the thin film resistor 24b. Accordingly, fine correction in resistance can be attained for the entire zero point balance temperature correcting thin film resistance 24. Particularly by correction of the serial resistance by the trimmed portions 34 at the thin film resistor 24a, an adjustment in resistance in an analog manner can be attained. Accordingly, the correction can be achieved with high accuracy. It is to be noted that laser trimming may be achieved for the span temperature correcting thin film resistor 25 in a similar procedure to that for the thin film resistor 24a.

Figure 7:
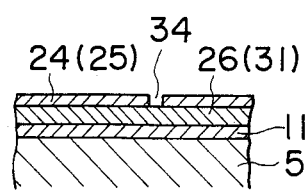
FIG. 7 is a vertical sectional front elevational view of the thin film resistor of FIGS. 6(a) and 6(b)
Figure 8:
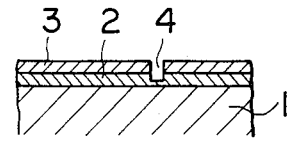
FIG. 8 is a vertical sectional front elevational view of part of a conventional load cell.

As for laser trimming in the present embodiment, since the substrate 26 (or substrate 31) exists on the insulator later 11 as shown in FIG. 7, the zero point balance temperature correcting thin film resistor 24 (or span temperature correcting thin film resistor 25) can be trimmed with accuracy while the insulator film 11 as well as the beam member 5 can be prevented readily from being trimmed, and accordingly the insulation of the load cell will not be damaged.

After completion of such temperature correction of the load cell, a coating or the like for prevention of humidity is formed over an upper face of the load cell.

Thus, according to the present embodiment, temperature correction of the load cell can be achieved with high operability by applying and connecting to the insulator film 11 of the beam member 5 the span resistor member 32 and the zero point balance resistor member 27 which are both prepared as separate pieces from the beam member 5 and by laser trimming the span resistor member 32 and the zero point balancing resistor member 27. Further, since the substrates 26, 31 of the zero point balance resistor member 27 and the span resistor member 32, respectively, are present on the insulator film 11 when trimming is achieved, accurate trimming can be achieved without a fear of damaging the insulation of the load cell. Besides, since objects of trimming for temperature correction are the resistor members 27, 32 which are formed as separate pieces from the beam member 5, the number of operations for sputtering when the thin material strain gauges 14 to 17 and so on are produced from a thin film can be reduced. In addition, since the substrates 26, 31 are formed from a ceramics material, even if they have a reduced thickness, they will not be deformed readily and will have a high insulation.

It is to be noted that, when the present invention is reduced to practice, the two substrates 26, 31 may be formed into a single substrate on which both of the zero point balance temperature correcting thin film resistor 24 and the span temperature correcting thin film resistor 25 are formed.

What is claimed is:

1. A load cell, comprising:
   a beam member having a thin material deformable portion thereon;
   an insulator film formed directly on a surface of said beam member;
   a bridge circuit formed on said insulator film and including thin film strain gauges and a zero point balance correcting resistor wherein said thin film strain gauges are formed on said film over said thin material deformable portion of said beam;
   leads of thin film conductors for connection of said bridge circuit;
   a span resistor member including a first substrate applied to said insulator film away from said thin material deformable portion of said beam member and a span temperature correcting thin film resistor formed on said substrate and connected to said bridge circuit, said span temperature correcting thin film resistor having a temperature coefficient; and
   a zero point resistor member including a second substrate applied to said insulator film away from said thin material deformable portion of said beam member and a zero point balance temperature correcting thin film resistor formed on said substrate and connected to said bridge circuit, said zero point balance temperature correcting thin film resistor having a temperature coefficient.

2. A load cell according to claim 1, wherein at least one of said span temperature correcting thin film resistor and said zero point balance temperature correcting thin film resistor is a thin Ni film.

3. A load cell according to claim 1, wherein at least one of said span temperature correcting thin film resistor and said zero point balance temperature correcting thin film resistor is a thin Ti film.

4. A load cell according to claim 1, wherein said substrates are made of a ceramics material.

5. A load cell according to claim 1, wherein said substrates are applied to portions of said beam member at which said substrates do not have an influence on deformation of said beam member.

6. A load cell according to claim 1, wherein said substrate on which said span temperature correcting thin film resistor is formed and said substrate on which said zero point balance temperature correcting thin film resistor is formed are formed as separate members from each other.

7. A method of correcting the temperature of a load cell, comprising:
   forming an insulator film directly on a surface of a thin material deformable portion of a beam member;
   forming a bridge circuit of thin film strain gauges including a zero point balanced correcting resistor and leads for electric connection of said bridge circuit on said insulator film by selective etching after formation of a thin film wherein said gauges are formed on said insulator film over said thin material deformable portion of said beam member;
   applying to said insulator film away from said thin material deformable portion of said beam member a span resistor member on which a span temperature correcting thin film resistor having a predetermined temperature coefficient is formed on a first substrate;
   applying to said insulator film away from said thin material deformable portion of said beam member a zero point resistor member on which a zero point balance temperature correcting thin film resistor having a predetermined temperature coefficient is formed on a second substrate;
   connecting said span temperature correcting thin film resistor and said zero point balance temperature correcting thin film resistor to said bridge circuit; and
   trimming said two thin film resistors with a laser beam to correct the temperature of said load cell.

8. A method of correcting the temperature of a load cell according to claim 7, wherein said zero point balance temperature correcting thin film resistor includes a parallelly connected resistor element and a serially connected resistor element therein.

* * * * *